United States Patent
Sureka

(10) Patent No.: US 11,600,272 B2
(45) Date of Patent: Mar. 7, 2023

(54) INTEGRATED VIRTUAL ASSISTANT IN OIL GAS DOMAIN APPLICATIONS

(71) Applicant: Schlumberger Technology Corporation, Sugar Land, TX (US)

(72) Inventor: Atul Sureka, Pune (IN)

(73) Assignee: Schlumberger Technology Corporation, Sugar Land, TX (US)

(*) Notice: Subject to any disclaimer, the term of this patent is extended or adjusted under 35 U.S.C. 154(b) by 300 days.

(21) Appl. No.: 16/946,868

(22) Filed: Jul. 9, 2020

(65) Prior Publication Data

US 2021/0012774 A1 Jan. 14, 2021

Related U.S. Application Data

(60) Provisional application No. 62/871,855, filed on Jul. 9, 2019.

(51) Int. Cl.
| | |
|---|---|
| *G10L 15/22* | (2006.01) |
| *G06N 3/006* | (2023.01) |
| *G06N 5/04* | (2023.01) |
| *G10L 15/18* | (2013.01) |
| *G06N 20/00* | (2019.01) |

(52) U.S. Cl.
CPC ............. *G10L 15/22* (2013.01); *G06N 3/006* (2013.01); *G06N 5/04* (2013.01); *G06N 20/00* (2019.01); *G10L 15/1815* (2013.01); *G10L 2015/223* (2013.01)

(58) Field of Classification Search
CPC ............. G10L 15/22; G10L 15/1815; G10L 2015/223; G10L 15/26; G06N 3/006; G06N 5/04; G06N 20/00; G06N 3/084; G06F 3/167
See application file for complete search history.

(56) References Cited

U.S. PATENT DOCUMENTS

| | | | |
|---|---|---|---|
| 11,204,787 B2* | 12/2021 | Radebaugh | G10L 15/1815 |
| 11,238,101 B1* | 2/2022 | Mohajer | G06F 16/24575 |
| 2019/0043483 A1* | 2/2019 | Chakraborty | G06N 3/0454 |
| 2019/0295549 A1* | 9/2019 | Oh | G10L 15/22 |
| 2020/0090652 A1* | 3/2020 | Hwang | G06F 3/167 |

* cited by examiner

*Primary Examiner* — Abul K Azad
(74) *Attorney, Agent, or Firm* — Michael Guthrie

(57) ABSTRACT

A computer-implemented method for facilitating navigation of an oil-gas domain application using a virtual assistant integrated within the oil-gas domain application includes generating a trained model for responding to utterances received from a user via a virtual assistant integrated within an oil-gas domain application. The trained model links the utterances to respective actions and responses; receiving a user utterance via the virtual assistant integrated within the oil-gas domain application. The method further includes determining a response to the user utterance using the trained model, wherein the response is associated with performing an action within the oil-gas domain application; and providing the response to the virtual assistant to cause the virtual assistant to execute the action within the oil-gas domain application.

20 Claims, 17 Drawing Sheets

INTEGRATED VIRTUAL ASSISTANT IN OIL GAS DOMAIN APPLICATIONS

CROSS-REFERENCE TO RELATED APPLICATIONS

This application claims priority to U.S. Provisional Patent Application 62/871,855, which was filed on Jul. 9, 2019, and is incorporated herein by reference in its entirety.

BACKGROUND

Oil-gas domain applications may include data intensive applications for covering a number of industry workflows. Such applications may incorporate the use of relatively complex user interfaces. Moreover, domain and application knowledge and a steep learning curve may be used to effectively use oil-gas domain applications.

SUMMARY

Embodiments of the disclosure may provide a computer-implemented method for facilitating navigation of an oil-gas domain application using a virtual assistant integrated within the oil-gas domain application includes generating a trained model for responding to utterances received from a user via a virtual assistant integrated within an oil-gas domain application. The trained model links the utterances to respective actions and responses; receiving a user utterance via the virtual assistant integrated within the oil-gas domain application. The method further includes determining a response to the user utterance using the trained model, wherein the response is associated with performing an action within the oil-gas domain application; and providing the response to the virtual assistant to cause the virtual assistant to execute the action within the oil-gas domain application.

Embodiments of the disclosure may also provide a computing system, including one or more processors; and a memory system comprising one or more non-transitory computer-readable media storing instructions that, when executed by at least one of the one or more processors, cause the computing system to perform operations. The operations may include generating a trained model for responding to utterances received from a user via a virtual assistant integrated within an oil-gas domain application. The trained model links the utterances to respective actions and responses; receiving a user utterance via the virtual assistant integrated within the oil-gas domain application. The operations further include determining a response to the user utterance using the trained model, wherein the response is associated with performing an action within the oil-gas domain application; and providing the response to the virtual assistant to cause the virtual assistant to execute the action within the oil-gas domain application.

Embodiments of the disclosure may further provide a non-transitory computer-readable medium storing instructions that, when executed by one or more processors of a computing system, cause the computing system to perform operations. The operations may include generating a trained model for responding to utterances received from a user via a virtual assistant integrated within an oil-gas domain application. The trained model links the utterances to respective actions and responses; receiving a user utterance via the virtual assistant integrated within the oil-gas domain application. The operations further include determining a response to the user utterance using the trained model, wherein the response is associated with performing an action within the oil-gas domain application; and providing the response to the virtual assistant to cause the virtual assistant to execute the action within the oil-gas domain application.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Figure 1:
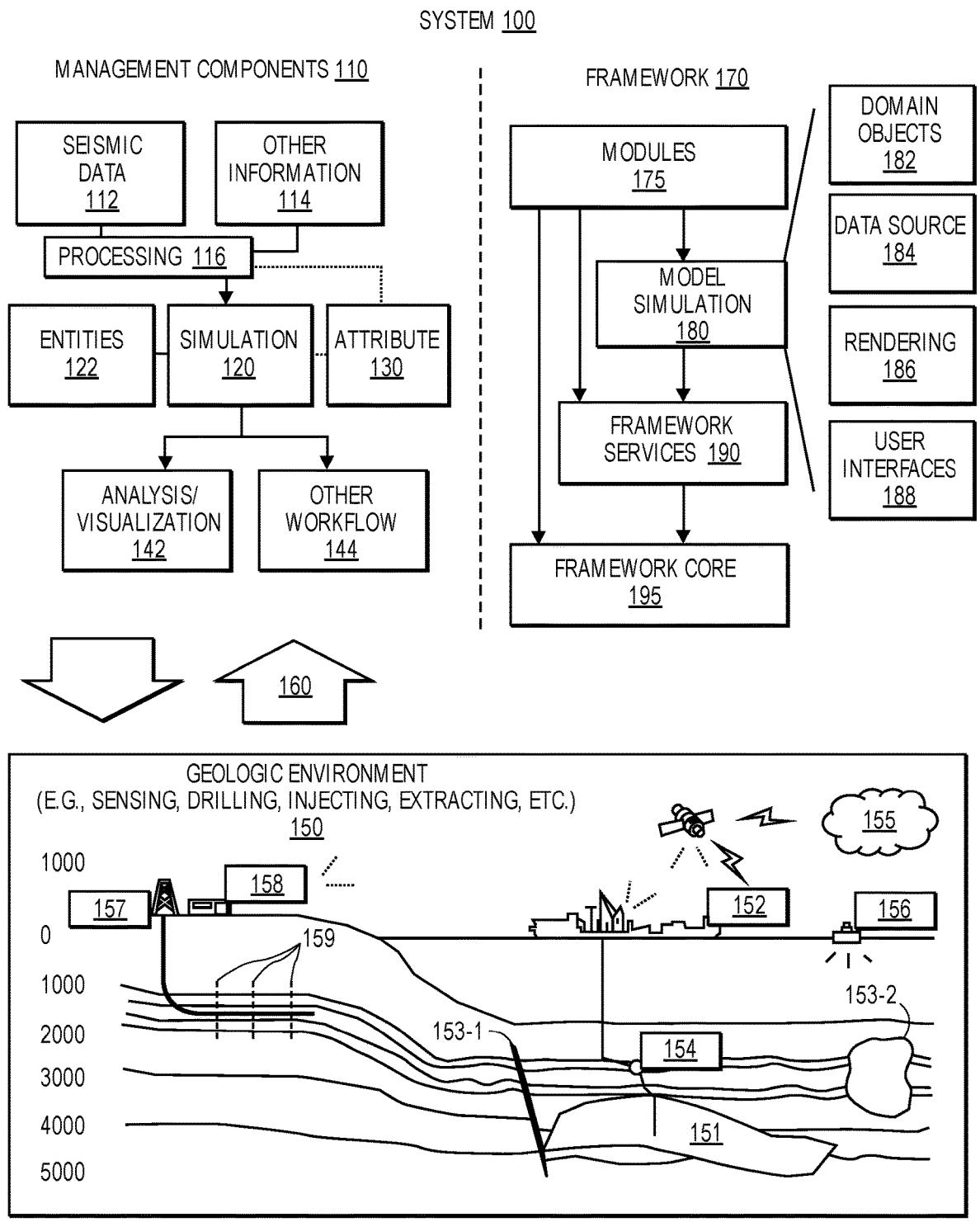
FIG. 1 illustrates an example of a system that includes various management components to manage various aspects of a geologic environment, according to an embodiment.

Oil-gas domain applications may include data intensive applications for covering a number of workflows. Such applications may incorporate the use of relatively complex user interfaces for accessing a complex set of data across multiple geographic locations across the globe. As such, domain and application knowledge and extensive training may be called for to effectively navigate and efficiently use oil-gas domain applications. For example, to perform a task, or obtain certain information using the oil-gas domain application, extensive background knowledge and/or training may be used to navigate through the interface of the application, or complex command lines may need to be entered. Accordingly, aspects of the present disclosure may integrate a voice-based virtual assistant into oil-gas domain applications to simplify and facilitate navigation through the oil-gas domain application and/or to simplify and facilitate execution of a variety of tasks using the application. That is, the virtual assistant may reduce the level of training and background knowledge that is previously required to effectively navigate and use oil-gas domain applications.

As described herein, aspects of the present disclosure may provide an artificial intelligence (AI) based integrated virtual assistant addon to an oil-gas domain application. In some embodiments, the virtual assistant may decipher natural language, allowing a user to speak commands for navigating the oil-gas application and/or executing certain tasks. The virtual assistant may be integrated with application knowledge to aid the user in performing complex workflows using natural language spoken commands. Accordingly, the virtual assistant allows the user to more easily use the oil-gas domain application without investing time and effort in learning complex user interface (UI) operations.

In some embodiments, the virtual assistant may respond to any number of voice inputs, thereby improving user experience. In some embodiments, a voice input may include a request for information, an instruction to perform a single task, an instruction to perform a series of multiple tasks in a workflow, and/or other type of voice input. As illustrative, non-limiting examples, the voice inputs to which the virtual assistant may respond may include naturally spoken phrases and/or questions, such as:

"What is today's production?"
Show me the Wells of 'Nahanni' field.
Open well logs of "Nahanni" oil field in Log Viewer.
Open Map viewer.

The virtual assistant may also respond to, process, and execute voice inputs that involve multiple steps, thus completing a workflow. As an illustrative, non-limiting example, the virtual assistant may respond to the voice input "Transfer wells from Studio Petrel to Studio Techlog". In some embodiments, the virtual assistant may be implemented as an addon to an oil-gas domain application running on a client computing device.

In some embodiments, the techniques described herein may implement AI and/or machine learning and training to determine responses to voice inputs related to an oil-gas domain application. For example, a voice input may be converted to text and processed with natural language processing. A training process may be incorporated to map natural language processing outputs to appropriate responses and actions. Further, error correction (e.g., back propagation and/or other error correction techniques) may be implemented as part of the training process. In some embodiments, information mapping voice inputs to appropriate responses may be stored in a database and used to determine responses to voice inputs received by a user. In some embodiments, business logic may be applied as part of response determination.

In some embodiments, voice input may be translated from speech to text, and the virtual assistant may process a response based on the text derived from the speech. In some embodiments, the virtual assistant may respond to text input provided via keyboard, rather than speech input. In this way the virtual assistant may function as a chatbot in addition to, or in alternative of a voice input response system.

As described herein, aspects of the present disclosure may include an oil-gas domain application with a virtual assistant integrated within the oil-gas domain application. More specifically, the oil-gas domain application may integrate the virtual assistant as an "add-on" or "plug-in." As one example, the oil-gas domain application may include a button or icon for accessing or triggering the virtual assistant to facilitate user navigation and/or workflow execution using the virtual assistant through natural language inputs. As described herein, the virtual assistant may be trained to respond to workflows of varying degrees of complexities in which the virtual assistant may interpret natural language inputs, present follow-up questions in connection with executing a workflow, and perform a variety of tasks via the oil-gas domain application in response to natural language inputs.

In some embodiments, the virtual assistant described herein may be integrated with other types of applications other than oil-gas domain applications. More specifically, a virtual assistant, consistent with aspects of the present disclosure, may be an "add-on" or "plug-in" software component that may be integrated with any variety of application types. That is, the virtual assistant, as described herein, may be integrated with an application without significant modification to the application's underlying code or structure. For example, the virtual assistant may work with, toggle, and/or execute any of the application's existing database of applications services. More specifically, the virtual assistant may be integrated into an application using a trained model that maps natural language voice commands to various tasks. That is, aside from the trained model (and optionally, a placeholder in a user interface for the application and/or other type of command for initiating the virtual assistant), no other components or modifications are needed to integrate the virtual assistant into an application. As such, the virtual assistant, consistent with aspects of the present disclosure, may function as a portable plug-in or add-on which may be easily integrated with any variety of applications to simplify and facilitate navigating through the application and/or executing tasks using the application.

Reference will now be made in detail to embodiments, examples of which are illustrated in the accompanying drawings and figures. In the following detailed description, numerous specific details are set forth in order to provide a thorough understanding of the disclosure. However, it will be apparent to one of ordinary skill in the art that techniques described in the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

FIG. 1 illustrates an example of a system 100 that includes various management components 110 to manage various aspects of a geologic environment 150 (e.g., an environment that includes a sedimentary basin, a reservoir 151, one or more faults 153-1, one or more geobodies 153-2, etc.). For example, the management components 110 may allow for direct or indirect management of sensing, drilling, injecting, extracting, etc., with respect to the geologic environment 150. In turn, further information about the geologic environment 150 may become available as feedback 160 (e.g., optionally as input to one or more of the management components 110).

In the example of FIG. 1, the management components 110 include a seismic data component 112, an additional information component 114 (e.g., well/logging data), a processing component 116, a simulation component 120, an attribute component 130, an analysis/visualization component 142 and a workflow component 144. In operation, seismic data and other information provided per the components 112 and 114 may be input to the simulation component 120.

In an example embodiment, the simulation component 120 may rely on entities 122. Entities 122 may include earth entities or geological objects such as wells, surfaces, bodies, reservoirs, etc. In the system 100, the entities 122 can include virtual representations of actual physical entities that are reconstructed for purposes of simulation. The entities 122 may include entities based on data acquired via sensing, observation, etc. (e.g., the seismic data 112 and other information 114). An entity may be characterized by one or more properties (e.g., a geometrical pillar grid entity of an earth model may be characterized by a porosity property). Such properties may represent one or more measurements (e.g., acquired data), calculations, etc.

In an example embodiment, the simulation component 120 may operate in conjunction with a software framework such as an object-based framework. In such a framework, entities may include entities based on pre-defined classes to facilitate modeling and simulation. A commercially available example of an object-based framework is the MICROSOFT® .NET® framework (Redmond, Wash.), which provides a set of extensible object classes. In the .NET® framework, an object class encapsulates a module of reusable code and associated data structures. Object classes can be used to instantiate object instances for use in by a program, script, etc. For example, borehole classes may define objects for representing boreholes based on well data.

In the example of FIG. 1, the simulation component 120 may process information to conform to one or more attributes specified by the attribute component 130, which may include a library of attributes. Such processing may occur prior to input to the simulation component 120 (e.g., consider the processing component 116). As an example, the simulation component 120 may perform operations on input information based on one or more attributes specified by the attribute component 130. In an example embodiment, the simulation component 120 may construct one or more models of the geologic environment 150, which may be relied on to simulate behavior of the geologic environment 150 (e.g., responsive to one or more acts, whether natural or artificial). In the example of FIG. 1, the analysis/visualization component 142 may allow for interaction with a model or model-based results (e.g., simulation results, etc.). As an example, output from the simulation component 120 may be input to one or more other workflows, as indicated by a workflow component 144.

As an example, the simulation component 120 may include one or more features of a simulator such as the ECLIPSE™ reservoir simulator (Schlumberger Limited, Houston Tex.), the INTERSECT™ reservoir simulator (Schlumberger Limited, Houston Tex.), etc. As an example, a simulation component, a simulator, etc. may include features to implement one or more meshless techniques (e.g., to solve one or more equations, etc.). As an example, a reservoir or reservoirs may be simulated with respect to one or more enhanced recovery techniques (e.g., consider a thermal process such as SAGD, etc.).

In an example embodiment, the management components 110 may include features of a commercially available framework such as the PETREL® seismic to simulation software framework (Schlumberger Limited, Houston, Tex.). The PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes. Such a framework may be considered an application and may be considered a data-driven application (e.g., where data is input for purposes of modeling, simulating, etc.).

In an example embodiment, various aspects of the management components 110 may include add-ons or plug-ins that operate according to specifications of a framework environment. For example, a commercially available framework environment marketed as the OCEAN® framework environment (Schlumberger Limited, Houston, Tex.) allows for integration of add-ons (or plug-ins) into a PETREL® framework workflow. The OCEAN® framework environment leverages .NET® tools (Microsoft Corporation, Redmond, Wash.) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

FIG. 1 also shows an example of a framework 170 that includes a model simulation layer 180 along with a framework services layer 190, a framework core layer 195 and a modules layer 175. The framework 170 may include the commercially available OCEAN® framework where the model simulation layer 180 is the commercially available PETREL® model-centric software package that hosts OCEAN® framework applications. In an example embodiment, the PETREL® software may be considered a data-driven application. The PETREL® software can include a framework for model building and visualization.

As an example, a framework may include features for implementing one or more mesh generation techniques. For example, a framework may include an input component for receipt of information from interpretation of seismic data, one or more attributes based at least in part on seismic data, log data, image data, etc. Such a framework may include a mesh generation component that processes input information, optionally in conjunction with other information, to generate a mesh.

In the example of FIG. 1, the model simulation layer 180 may provide domain objects 182, act as a data source 184, provide for rendering 186 and provide for various user interfaces 188. Rendering 186 may provide a graphical environment in which applications can display their data while the user interfaces 188 may provide a common look and feel for application user interface components.

As an example, the domain objects 182 can include entity objects, property objects and optionally other objects. Entity objects may be used to geometrically represent wells, surfaces, bodies, reservoirs, etc., while property objects may be used to provide property values as well as data versions and display parameters. For example, an entity object may represent a well where a property object provides log information as well as version information and display information (e.g., to display the well as part of a model).

In the example of FIG. 1, data may be stored in one or more data sources (or data stores, generally physical data storage devices), which may be at the same or different physical sites and accessible via one or more networks. The model simulation layer 180 may be configured to model projects. As such, a particular project may be stored where stored project information may include inputs, models, results and cases. Thus, upon completion of a modeling session, a user may store a project. At a later time, the project can be accessed and restored using the model simulation layer 180, which can recreate instances of the relevant domain objects.

In the example of FIG. 1, the geologic environment 150 may include layers (e.g., stratification) that include a reservoir 151 and one or more other features such as the fault 153-1, the geobody 153-2, etc. As an example, the geologic environment 150 may be outfitted with any of a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or instead include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

As mentioned, the system 100 may be used to perform one or more workflows. A workflow may be a process that includes a number of worksteps. A workstep may operate on data, for example, to create new data, to update existing data, etc. As an example, a may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable in the PETREL® software, for example, that operates on seismic data, seismic attribute(s), etc. As an example, a workflow may be a process implementable in the OCEAN® framework. As an example, a workflow may include one or more worksteps that access a module such as a plug-in (e.g., external executable code, etc.).

Figure 2:
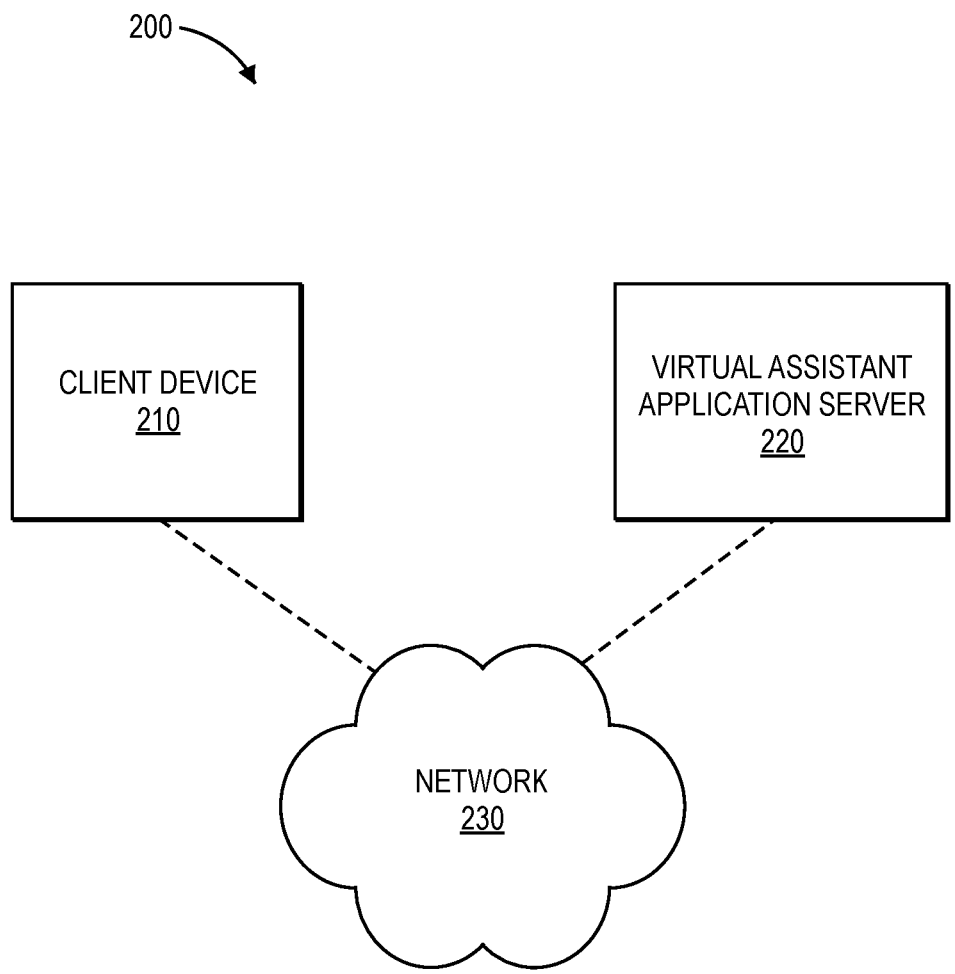
FIG. 2 illustrates an example environment as described herein.

FIG. 2 illustrates an example environment in accordance with aspects of the present disclosure. As shown in FIG. 2, environment 200 includes a client device 210, a virtual assistant application server 220, and a network 230.

The client device 210 may include a computing device capable of communicating via a network, such as the network 230. In example embodiments, the client device 210 corresponds to any type of computing device that hosts an application (e.g., an oil-gas domain application). In some embodiments, the client device may include a portable computer device (e.g., a laptop or a tablet computer), a desktop computer, a server device, and/or another type of computing device. As described herein, the client device 210 may host an oil-gas domain application with an integrated virtual assistant, consistent with aspects of the present disclosure. The client device 210, through the virtual assistant, may communicate with the virtual assistant application server 220 to provide the virtual assistant application server 220 with voice-based user commands (e.g., containing utterances), and receive corresponding instructions from the virtual assistant application server 220 for appropriately responding to the voice commands.

The virtual assistant application server 220 may include one or more computing devices that forms trained models that links user provided utterances or user voice commands to intended actions to be performed by an application hosted by the client device 210. In some embodiments, the virtual assistant application server 220 may apply natural language processing (NLP) and/or artificial intelligence (AI) techniques to further expand and refine the trained model. The virtual assistant application server 220 may store a trained model for deployment, receive feedback based on use of the trained model, and further update and refine the trained model based on the feedback (e.g., based on feedback indicating that certain utterances or voice commands resulted in incorrect actions being taken).

The network 230 may include network nodes and one or more wired and/or wireless networks. For example, the network 230 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, the network 230 may include a local area network (LAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks. In embodiments, the network 230 may include copper transmission cables, optical transmission fibers, wireless transmission, routers, firewalls, switches, gateway computers and/or edge servers.

The quantity of devices and/or networks in the environment 200 is not limited to what is shown in FIG. 2. In practice, the environment 200 may include additional devices and/or networks; fewer devices and/or networks; different devices and/or networks; or differently arranged devices and/or networks than illustrated in FIG. 2. Also, in some implementations, one or more of the devices of the environment 200 may perform one or more functions described as being performed by another one or more of the devices of the environment 200. Devices of the environment 200 may interconnect via wired connections, wireless connections, or a combination of wired and wireless connections.

Figure 3A:
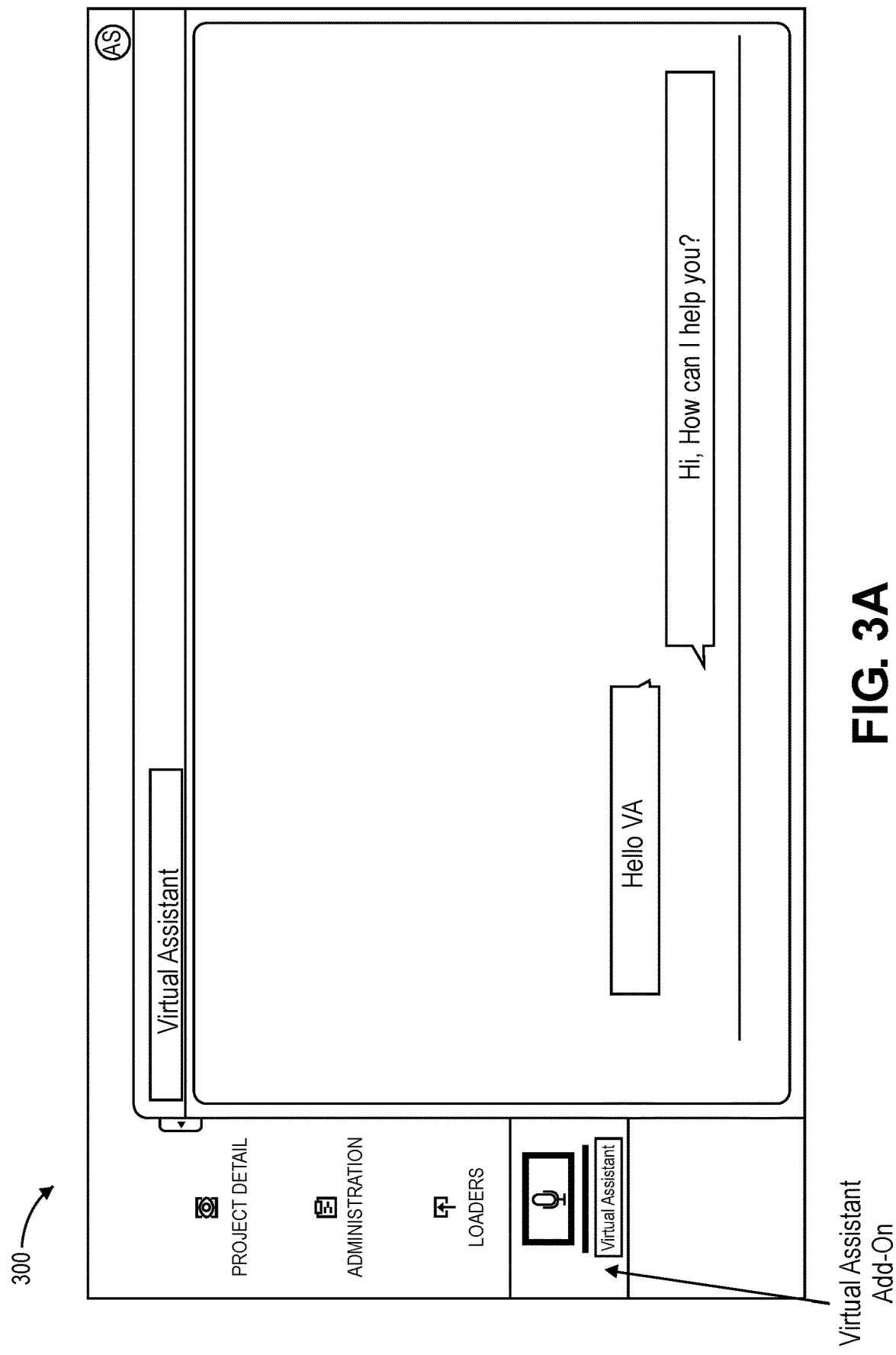
FIGS. 3A-3K illustrate an example of a virtual assistant interface for receiving voice inputs from a user and responding to the voice inputs.

FIGS. 3A-3K illustrate an example of a virtual assistant interface for receiving voice inputs from a user and responding to the voice inputs. As shown in FIG. 3A, the virtual assistant may be provided as an add-on or plug-in in an oil-gas domain application (e.g., hosted by the client device 210). The add-on may be represented by an icon, which, when selected, may present the virtual assistant interface 300. Upon initial selection of the add-on, the user may begin an interactive communication with the virtual assistant. As described herein, the functions of the virtual assistant may be provided by the virtual assistant application server 220.

In some embodiments, the user may instruct the virtual assistant to begin "listening" to a voice input (e.g., by selection of a microphone icon, speaking a keyword, a keystroke combination, etc.). The user may then speak a voice input, which may be translated from speech to text and presented within the virtual assistant interface 300. In the example shown, the virtual assistant may receive the voice input such as "Hello VA.". In response, the virtual assistant interface 300 may present a message from the virtual assistant (e.g., a welcome message, such as "Hi, how can I help you?"). In some embodiments, the virtual assistant messages may also be presented audibly.

Figure 3B:
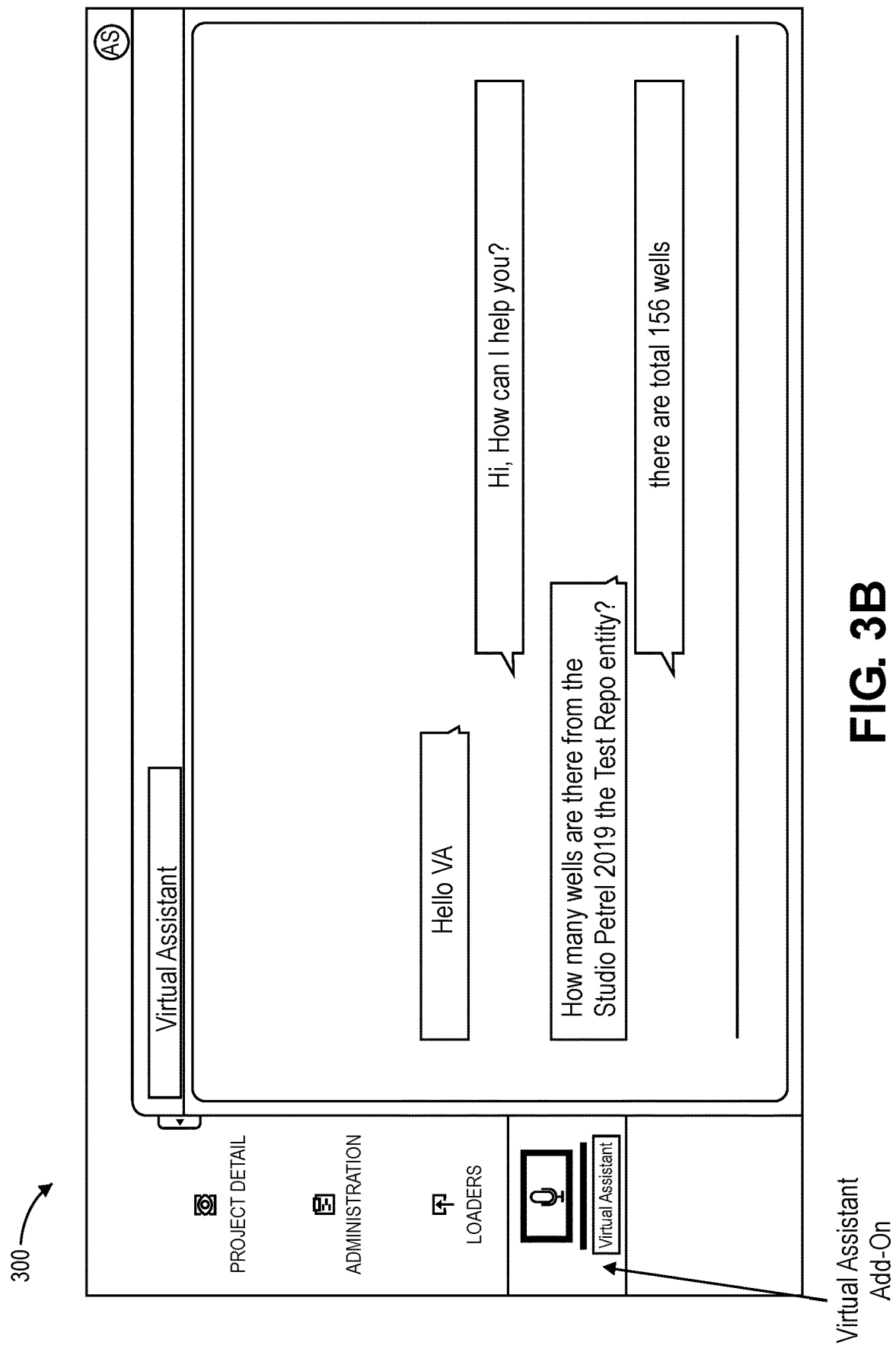

Referring to FIG. 3B, the user may provide additional voice input, such as "How many wells are there from the Studio Petrel 2019 the Test Repo entity?" In response, the virtual assistant may reply with "There are a total of 156 wells." In this way, the user may obtain oil-gas domain-related information simply by speaking naturally and asking the virtual assistant a question as if the user were speaking naturally to another individual, thereby facilitating and simplifying the user's experience for obtaining information from the oil-gas domain application. As described in greater detail herein, the virtual assistant application server 220 may process the input speech using a trained model to determine the user's intent behind the voice command and identify an appropriate and corresponding action. In the example shown, the virtual assistant application server 220 identifies (e.g., using the trained model) that the user's intent is to obtain a set of data relating to the number of wells in a particular entity (e.g., the "Studio Petrel 2019 Test Repo entity").

Figure 3C:
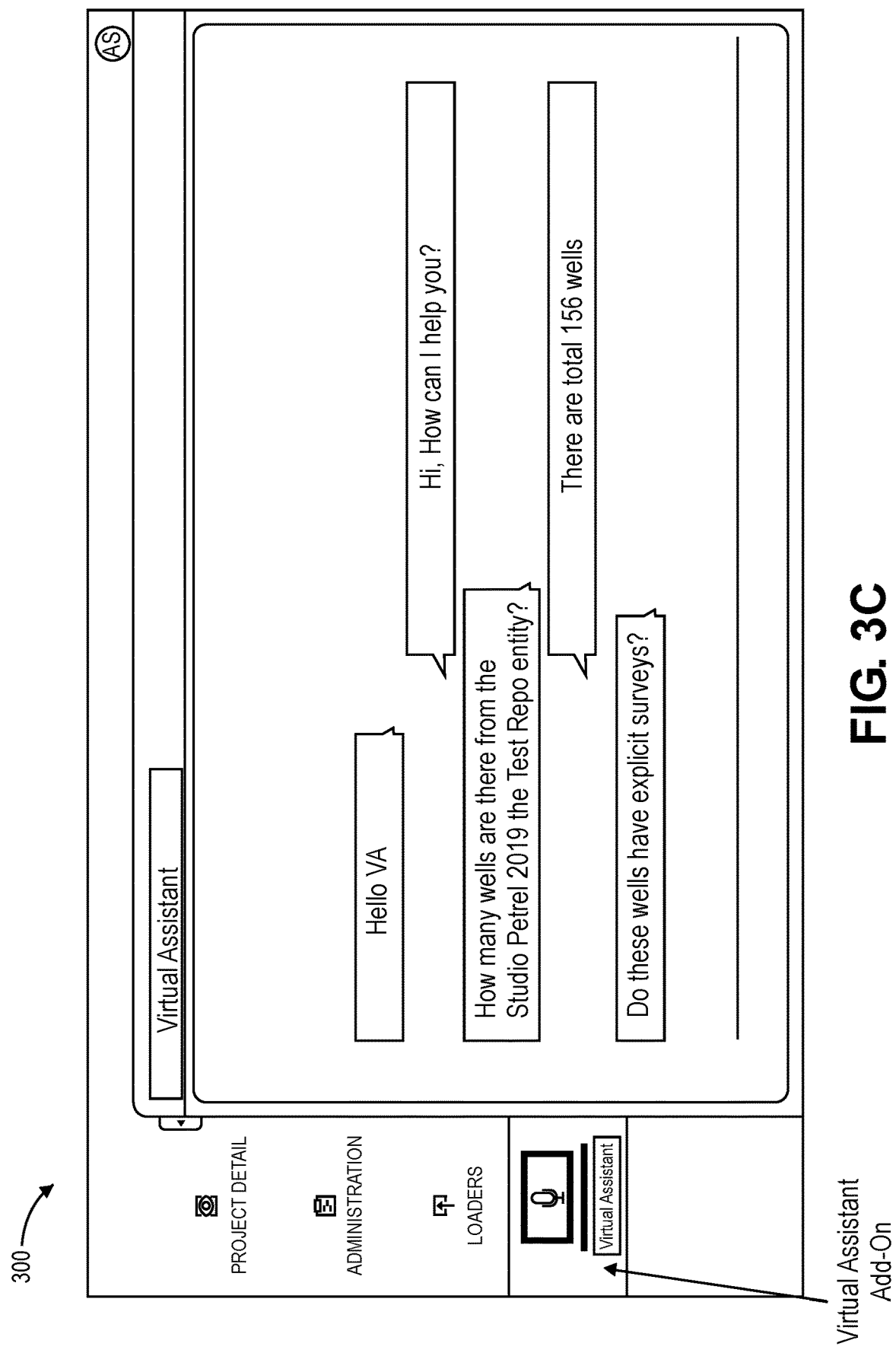
Figure 3D:
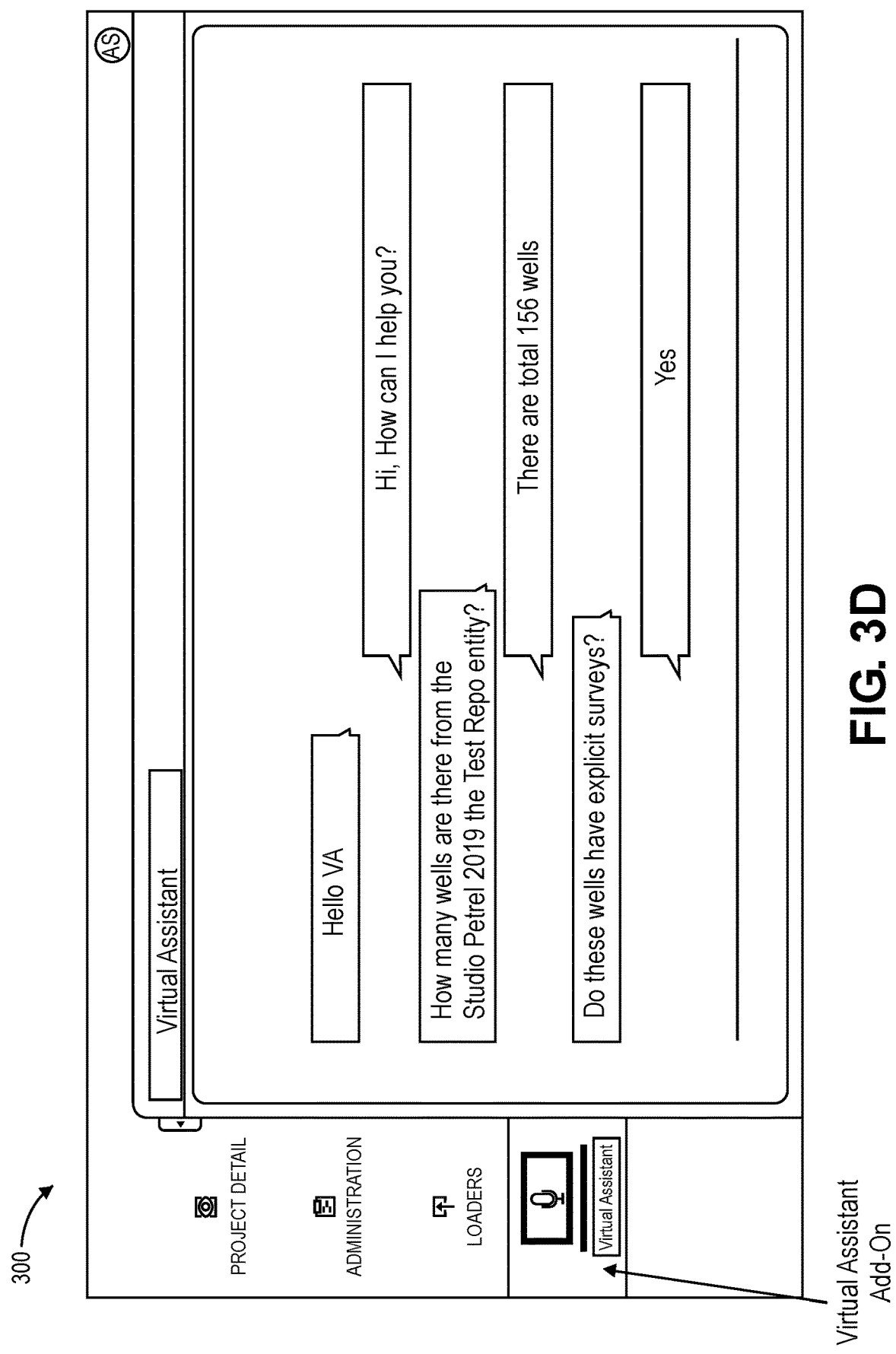

Continuing with the above example, and referring to FIG. 3C, the user may speak another command, such as "Do these wells have explicit surveys?" Referring to FIG. 3D, the virtual assistant may respond with "Yes." More specifically, the virtual assistant application server 220 may use the trained model to process the command "Do these wells have explicit surveys?" and may automatically access data from the oil-gas domain application to determine whether the wells have explicitly surveys. For example, the trained model may indicate that the utterance "Do these wells have explicit surveys?" corresponds to the user's intent to determine whether the wells have explicit surveys. Further, the trained model may identify that based on this intent, the appropriate response to this utterance is to execute an instruction to access data from the oil-gas domain application to determine whether the wells have explicit surveys and report the corresponding results. In this way, the user may obtain information of interest without the need for navigating through the application.

Figure 3E:
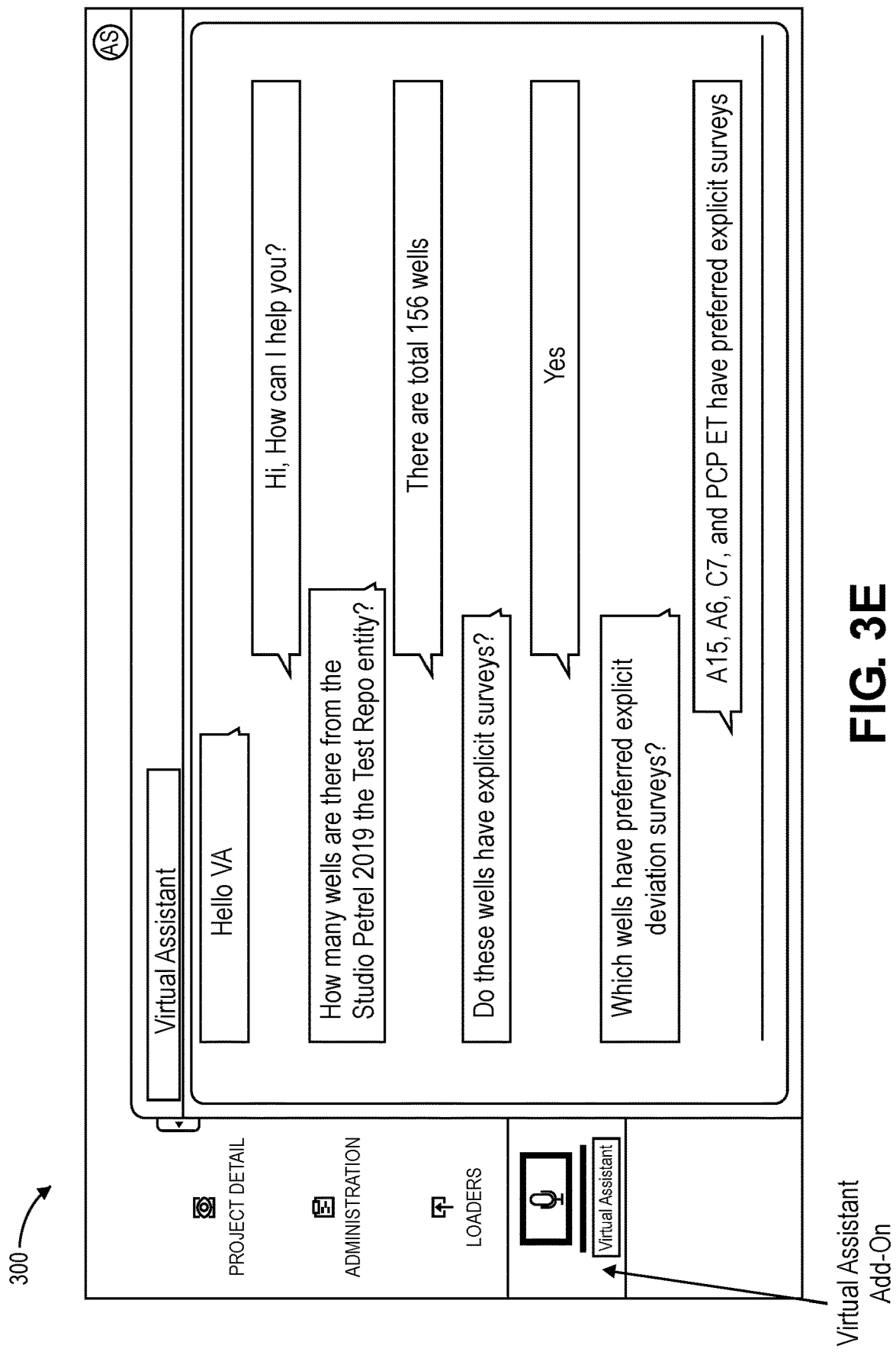

Continuing with the above example, and referring to FIG. 3E, the user may ask "Which wells have preferred explicit deviation surveys?" The virtual assistant may respond with "A15, A6, C7, and PCP ET have preferred explicit surveys." More specifically, the virtual assistant application server 220 may use the trained model to process the command "Which wells have preferred explicit deviation surveys?" and may automatically access data from the oil-gas domain application to determine which wells have preferred explicit deviation surveys and report the corresponding results.

Figure 3F:
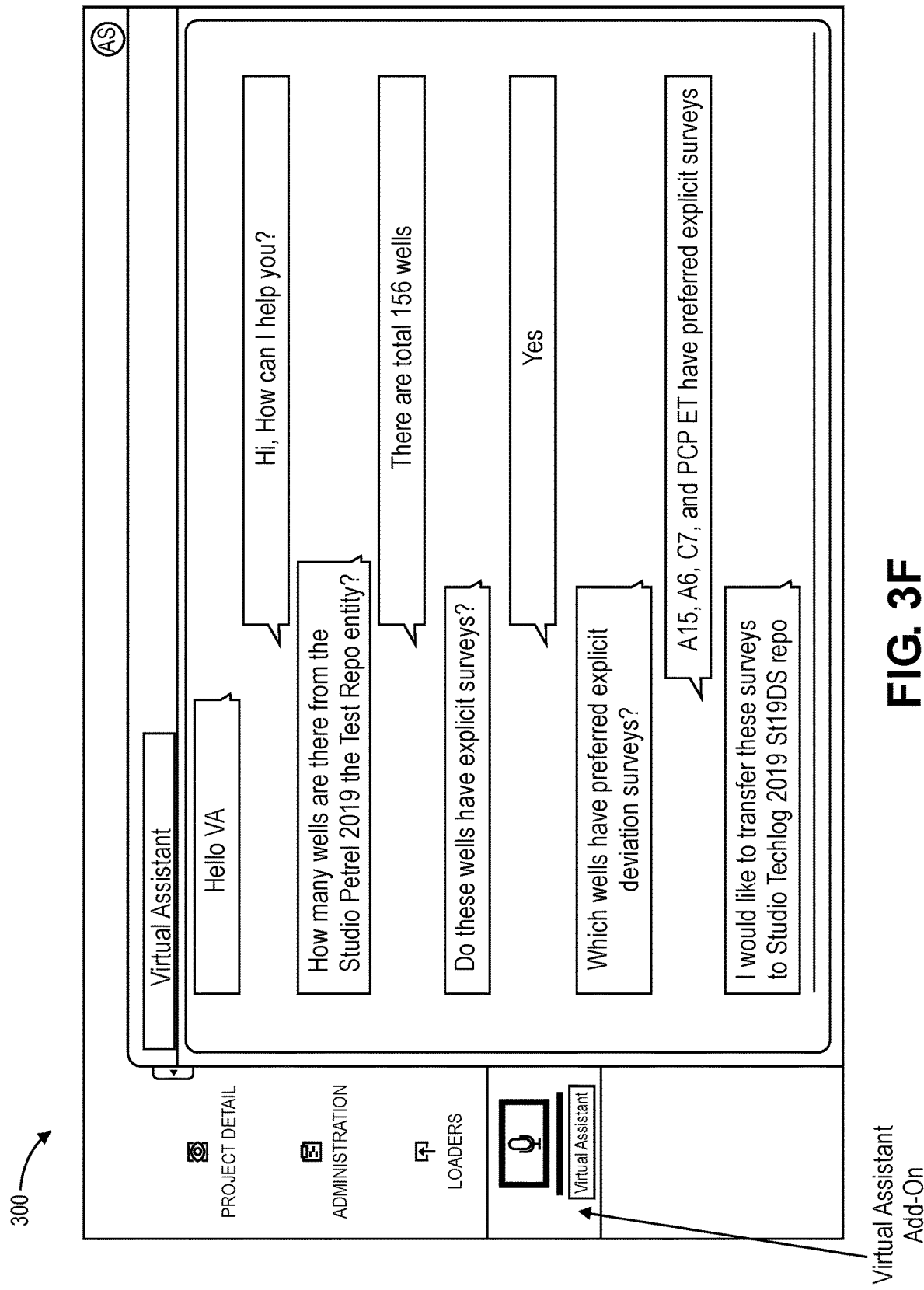
Figure 3G:
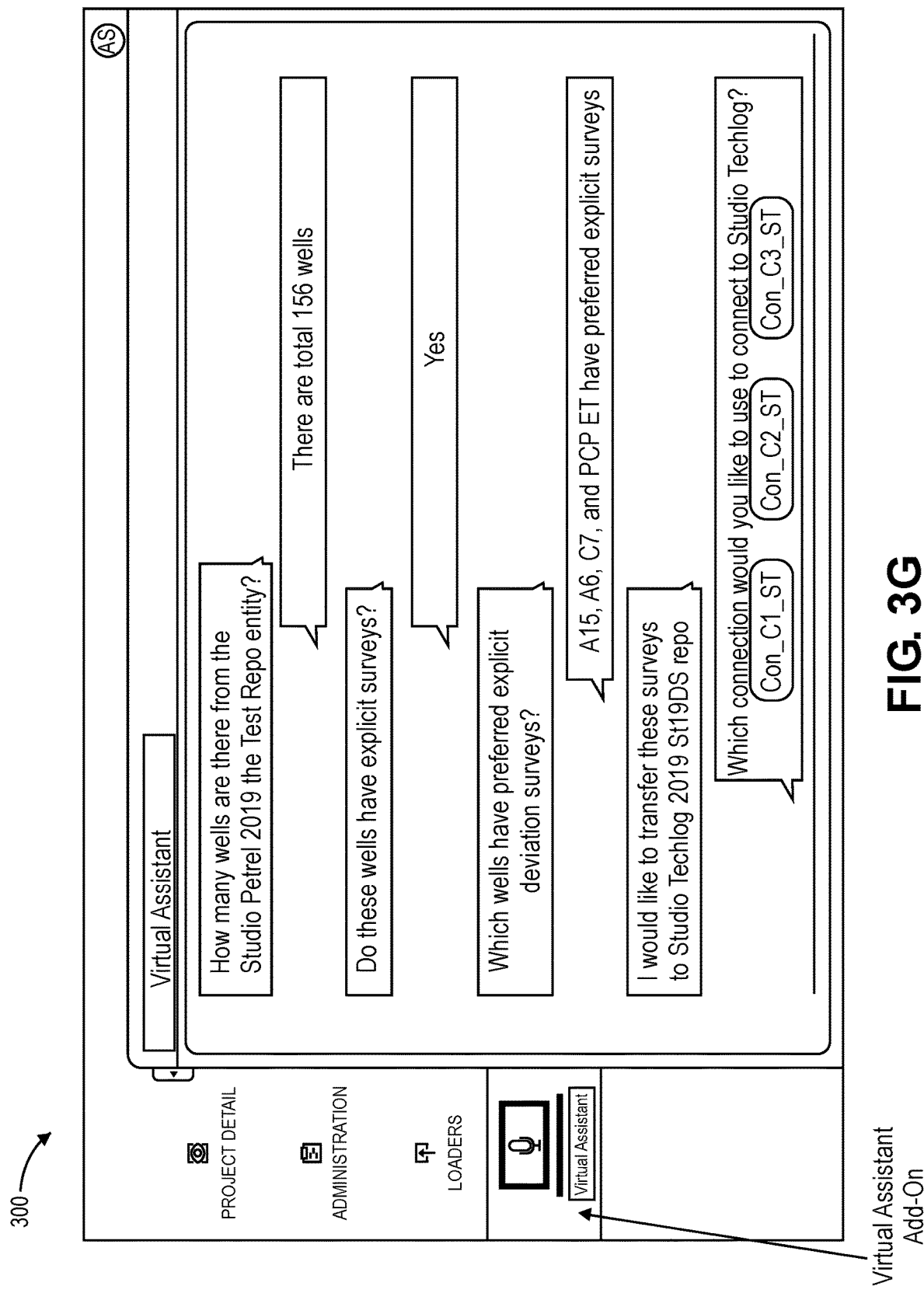

Continuing with the above example, and referring to FIG. 3F, the user may speak the command "I would like to transfer these surveys to Studio Techlog 2019 St19DS repo." Referring to FIG. 3G, the virtual assistant may respond with "Which connection would you like to use to connect to Studio Tech Log?" along with a set of connection options. More specifically, the virtual assistant application server 220 may use the trained model to process the command "I would like to transfer these surveys to Studio Techlog 2019 St19DS repo." For example, the trained model may identify the user's intent behind the voice command, and that based on the user's intent, the voice assistant is to present a list of connection options.

Figure 3H:
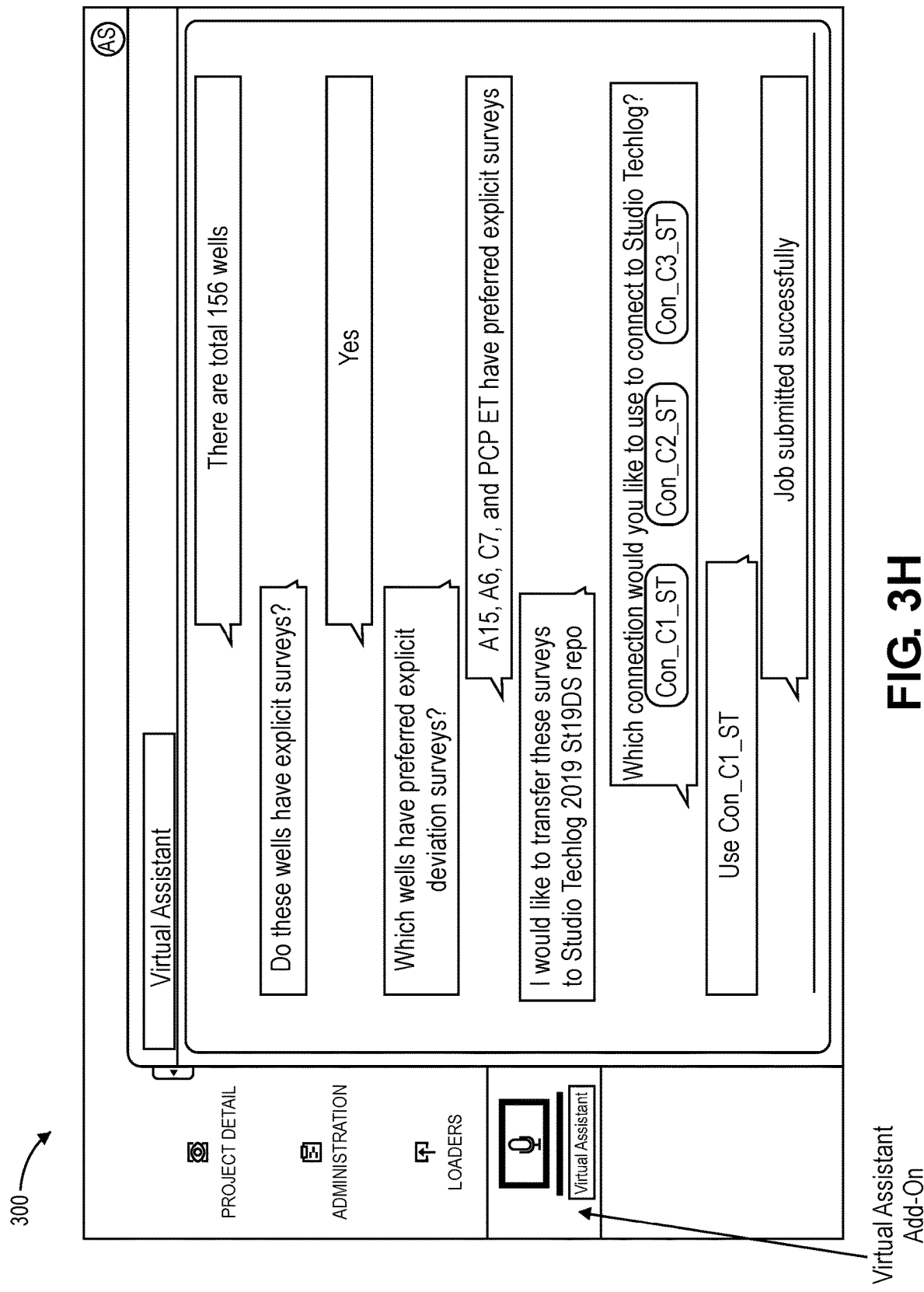

Continuing with the above example, and referring to FIG. 3H, the user may select a particular connection option (e.g., by responding with voice command "Use Con_C1_ST"). Based on receiving the selection, the virtual assistant application server 220 may instruct the client device 210 to establish a connection with the selected connection option and the virtual assistant may respond with "Job submitted successfully."

Figure 3I:
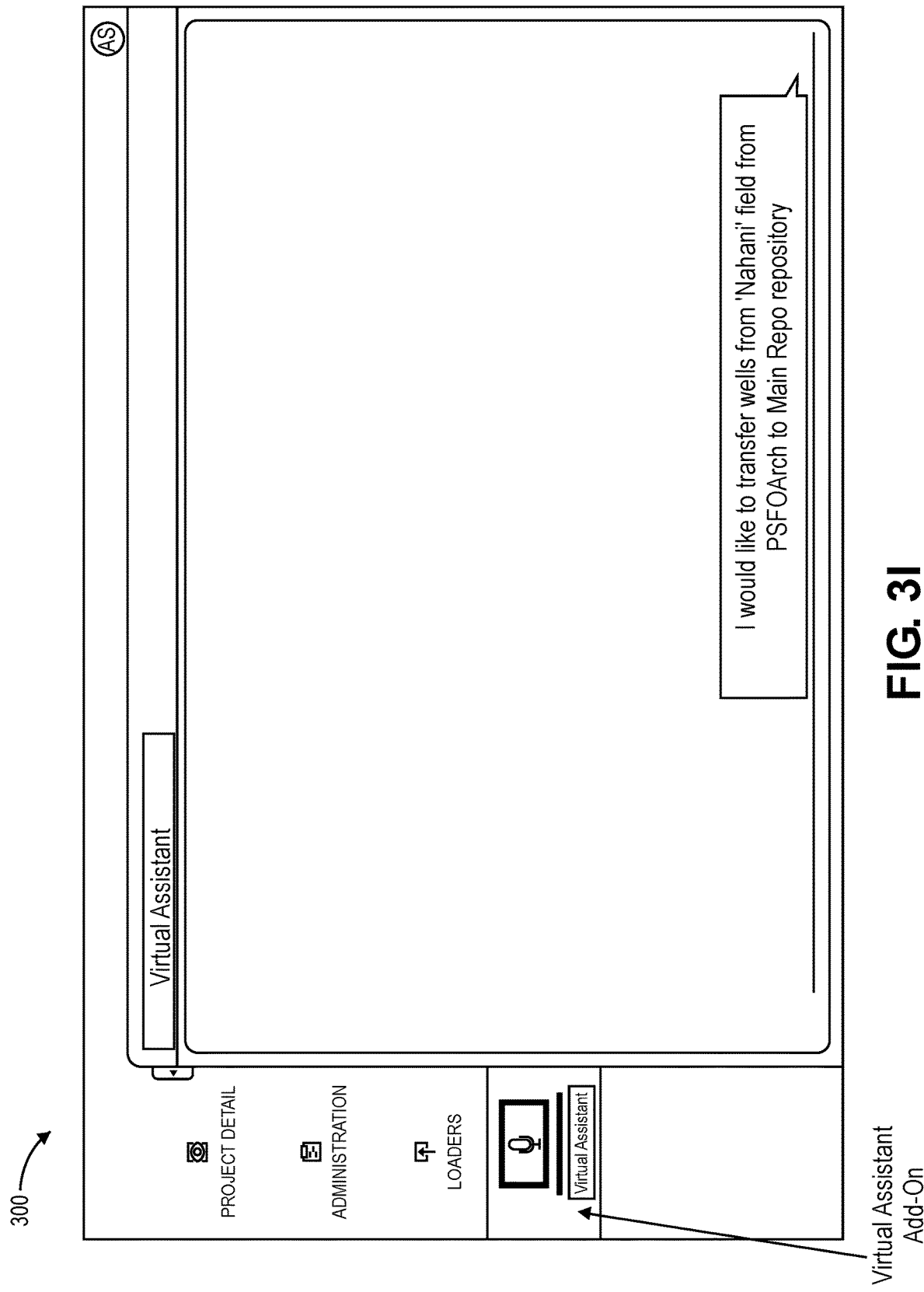
Figure 3J:
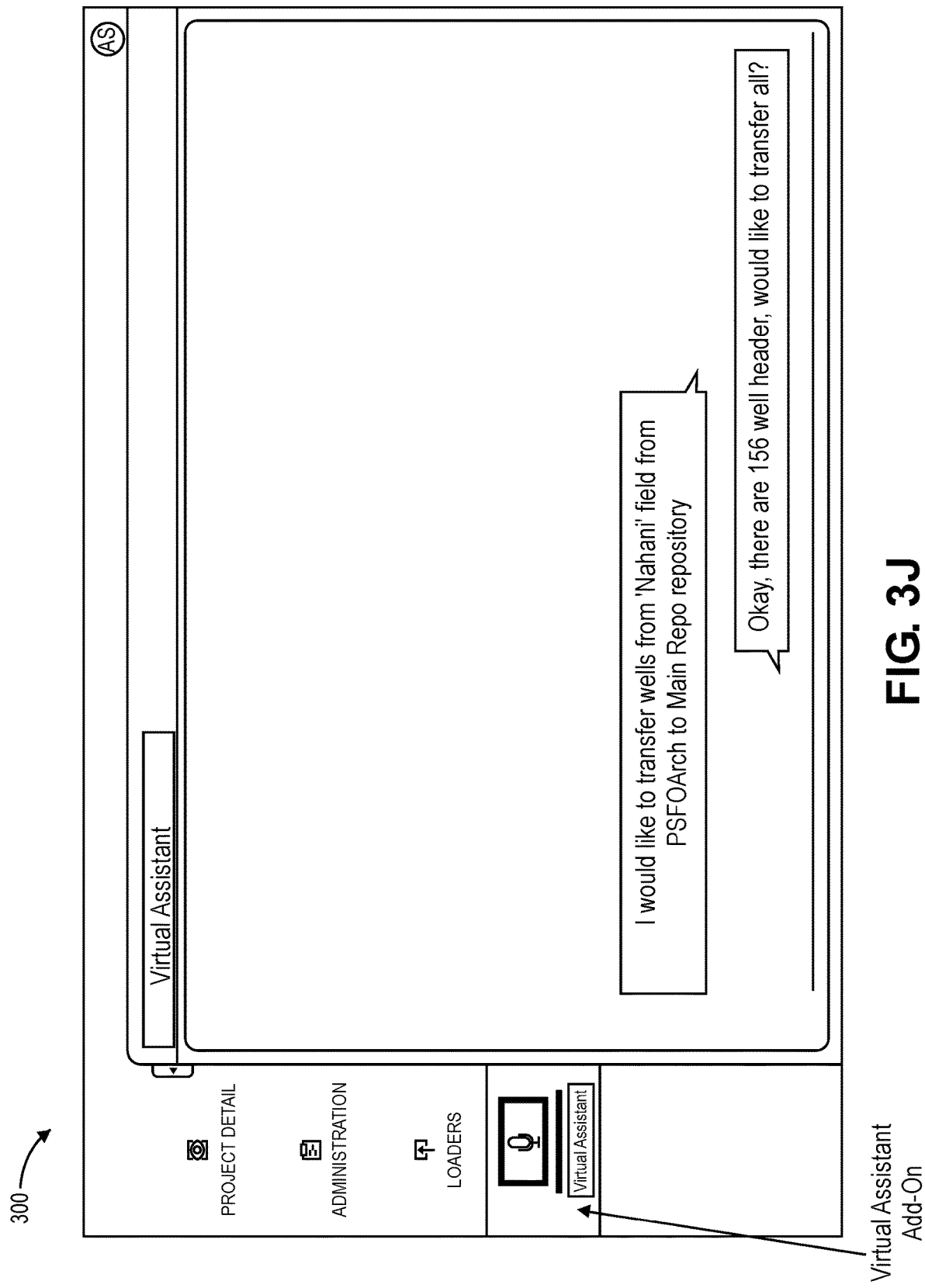

Referring to FIG. 3I, the user may provide another voice command for performing a different task (e.g., a task to transfer data from one type of field to another). For example, the user may speak the phrase "I would like to transfer wells from Nahani field from PSFOArch to MainRepo Repository." Referring to FIG. 3J, the virtual assistant may respond with "Okay, there are 156 well headers, would you like to transfer all?" For example, the virtual assistant application server 220 may use the trained model to identify the intent of the utterance "I would like to transfer wells from Nahani field from PSFOArch to MainRepo Repository" and identify a corresponding response to the utterance. In this example, the trained model may indicate that the appropriate response to the utterance is to identify the number of well headers, and query the user as to which well headers to transfer.

Figure 3K:
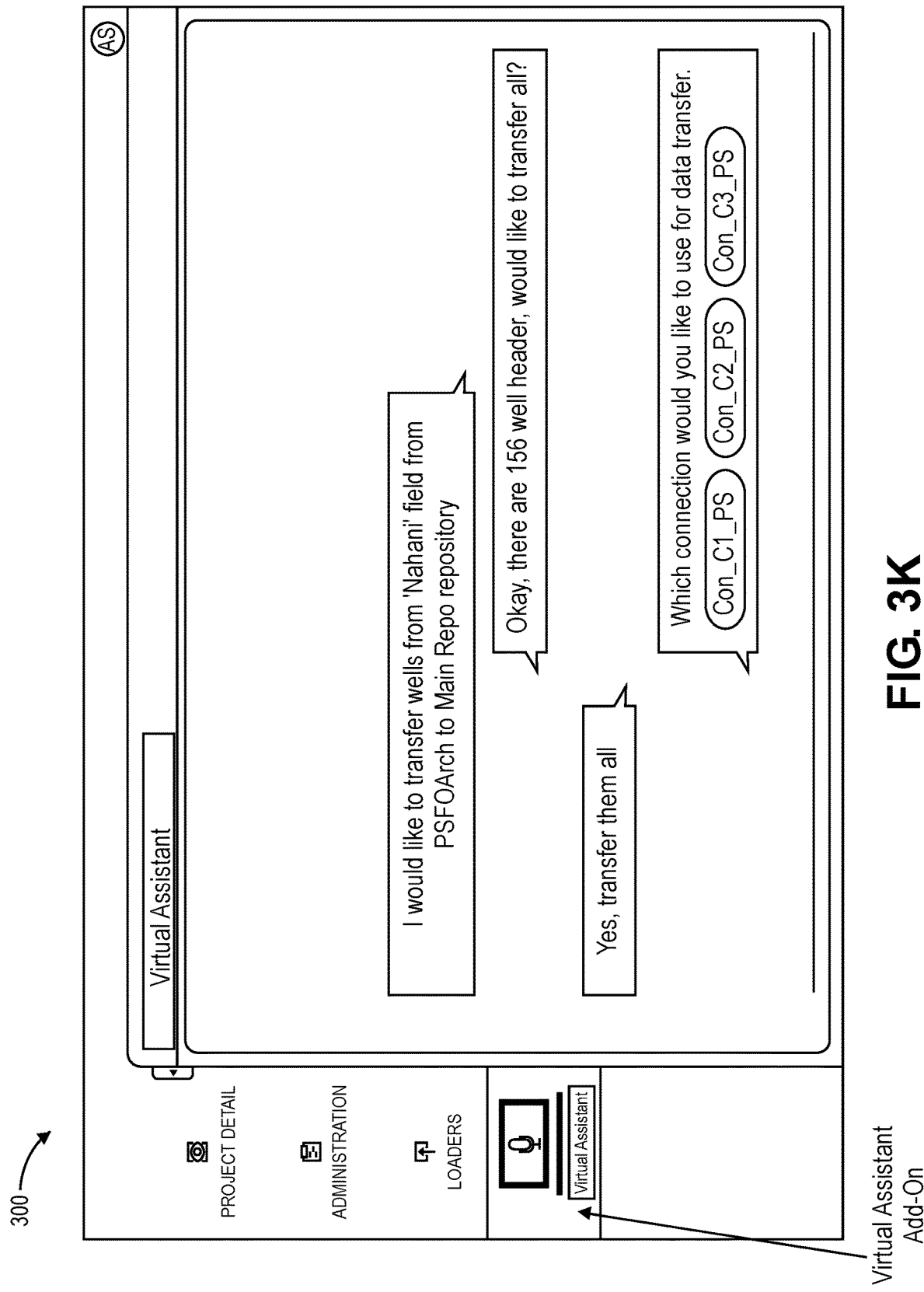

Continuing with the above example, and referring to FIG. 3K, the user may respond to the query from the virtual assistant with the utterance "Yes, transfer them all." Based on receiving this response, the virtual assistant may query the user as to which connection type to use (e.g., as similarly described above with respect to the example shown in FIG. 3G).

In some embodiments, the virtual assistant may present any data in response to an utterance (e.g., voice command) received from a user in the form of a chart with the information requested by the user. For example, the trained model may identify that the appropriate response to the voice command is to present information in a table format.

As described herein, the virtual assistant may simplify the manner in which the user may obtain information from and/or execute a task using an oil-gas domain application. Specifically, the virtual assistant may build a trained model, receive utterances (e.g., via the user's voice of spoken phrases and/or text input), and use the trained model to determine the appropriate response the received utterance. In this way the user may more easily obtain information and/or perform a task (e.g., a transfer of data between data repositories). Further, the virtual assistant may be easily integrated into the oil-gas domain application (or other type of application) and leverage the existing database of services available by the application. Additionally, the virtual assistant may be easily integrated without the need to modify the underlying functionality of the application.

Figure 4:
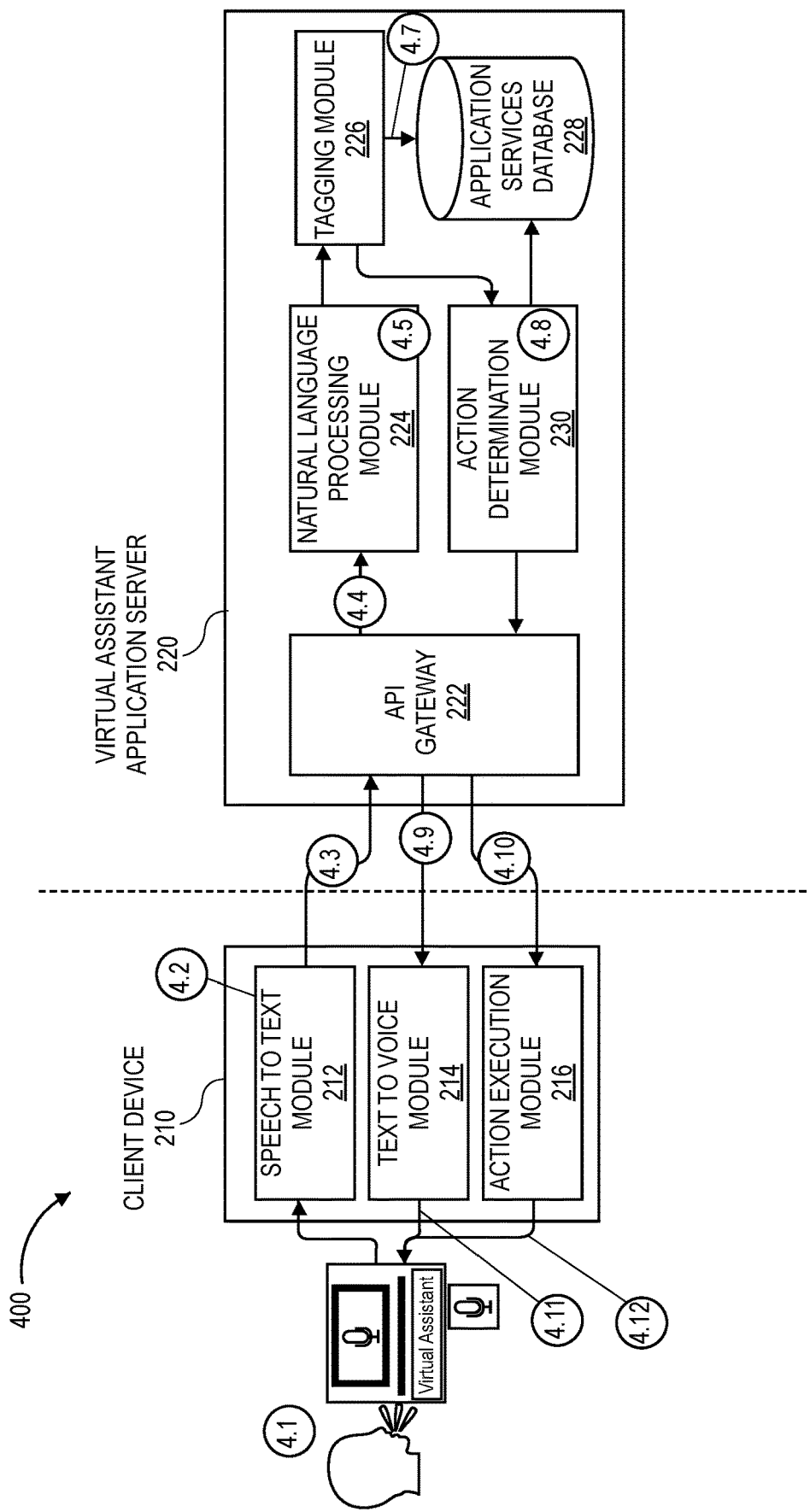
FIG. 4 illustrates an example block diagram and process for deciphering and processing a voice input in order to provide an appropriate response to the voice input.

FIG. 4 illustrates an example block diagram and process for deciphering and processing a voice input in order to provide an appropriate response to the voice input. As shown in FIG. 4, the client device 210 may include a speech to text module 212, a text to voice module 214, and an action execution module 216. The virtual assistant application server 220 may include an API gateway 222, a natural language processing module 224, a tagging module 226, an application services database 228, and an action determination module 230. As described herein, the virtual assistant add-on may be integrated into an oil-gas domain application hosted by the client device 210. The virtual assistant may receive a user's speech input (as at 4.1), and the speech to text module 212 may convert the user's speech input into text (as at 4.2). The text may be sent to the virtual assistant application server 220 for processing (as at 4.3). In some embodiments, the API gateway 222 may route the text to the natural language processing module 224 (as at 4.4), which applies NLP techniques to the text to determine context and/or intent information for the input (as at 4.5). The tagging module 226 may receive and tag the output from the natural language processing module 224 (as at 4.6). In some embodiments, the tag may indicate the type of request and/or any information that may be used to determine the action for processing the voice input. The application services database 228 may store information regarding application services and tags associated with the application services, such as application services to be invoked based on the tag (as at 4.7). In some embodiments, the action determination module 230 may determine an action to take based on the tag (as at 4.8). The virtual assistant application server 220 (e.g., via the API gateway 222) may provide responses to the request (e.g., in JSON format or other type of format). For example, the action determination module 230 may provide a text response (as at 4.9) and an action execution response (as at 4.10). The text to voice module 214 may convert the text response to voice and provide an audible response via the virtual assistant (e.g., as at 4.11). The virtual assistant may also display the text response. The action execution module 216 may receive the action execution response and perform a UI operation and/or other execute any other task via the application as indicated in the action execution response (as at 4.12).

Figure 5:
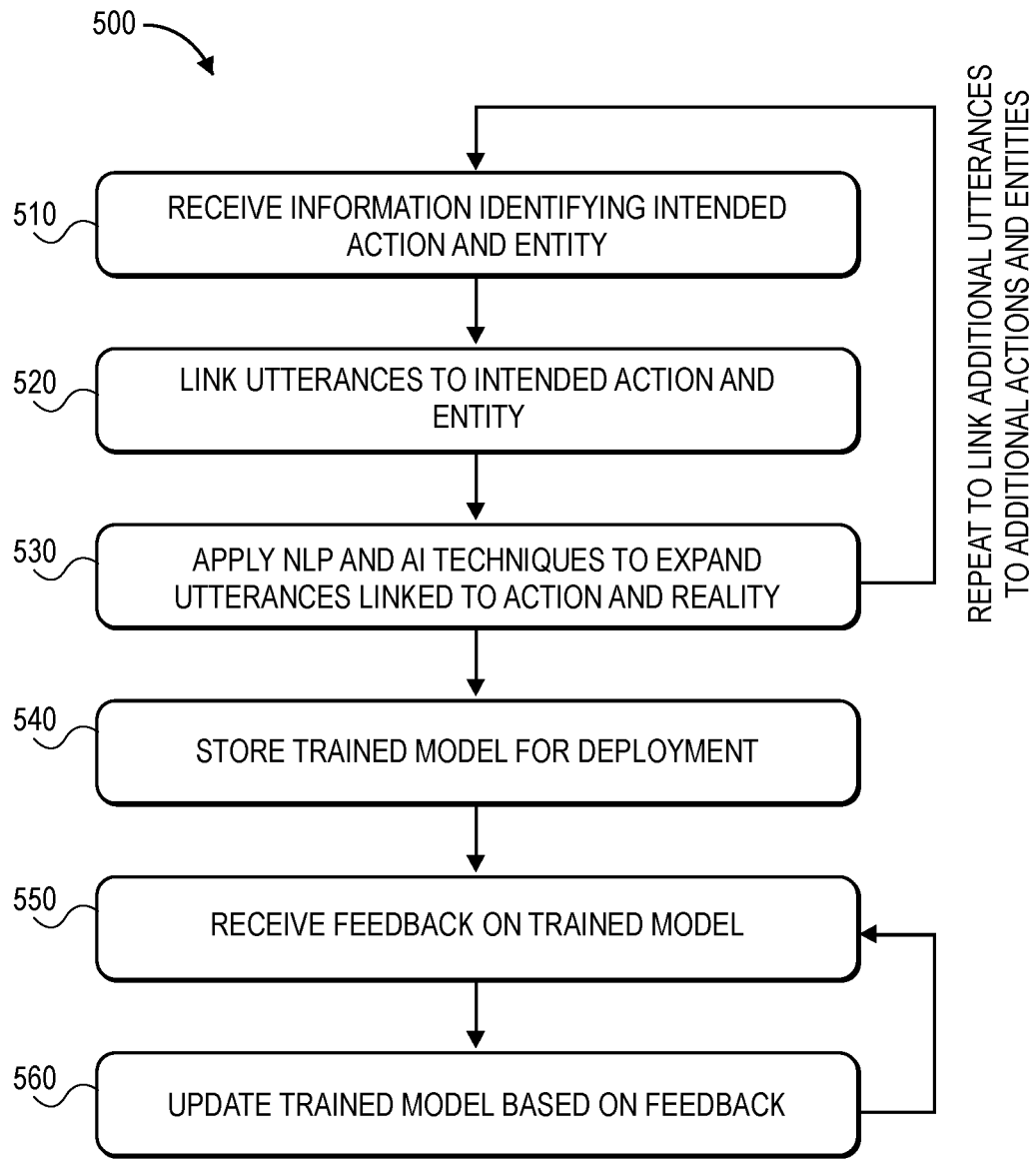
FIG. 5 illustrates an example flowchart of a process for generating and refining a trained model for use by a virtual assistant to response to natural language utterances or voice inputs as described herein.

FIG. 5 illustrates an example flowchart of a process for generating and refining a trained model for use by a virtual assistant to respond to natural language utterances or voice inputs. The blocks of FIG. 5 may be implemented in the environment of FIG. 2, for example, and are described using reference numbers of elements depicted in FIG. 2. As noted herein, the flowchart illustrates the architecture, functionality, and operation of possible implementations of systems, methods, and computer program products according to various embodiments of the present disclosure.

As shown in FIG. 5, The process 500 may include receiving information identifying intended action and entity (as at 510). For example, the virtual assistant application server 220 may receive information identifying an intended action and an entity for an application in which a virtual assistant may be integrated (e.g., an oil-gas domain application). As described herein, an entity may relate to an application service, a type of data, a data repository, a computing system, a machine, and/or other type of entity in which to apply the intended action. In some embodiments, an action may define a task associated with the entity to be performed (e.g., an action to view certain data associated with the entity, transfer data associated with the entity, output a control instruction associated with the entity, etc.). In some embodiments, an operator of the virtual assistant application server 220 may enter information identifying the intended action and entity. Additionally, or alternatively, the virtual assistant application server 220 may receive the information identifying the intended action and entity from an application catalogue or application database defining the services available or provided by the application. As one illustrative example, an intent may include a request for obtaining data, and the entity may include a type of data (e.g., oil well-related data for oil wells in a dry state).

The process 500 also may include linking utterances to the intended action and entity (as at 520). For example, the virtual assistant application server 220 may receive an utterance and an instruction to link the utterance to the intended action and entity. As an example, the utterance may include a phrase, such as "What is the total number of wells having a dry state?" The virtual assistant application server 220 may link this utterance to the intent and entity (e.g., from block 510). For example, the virtual assistant application server 220 may link the utterance "What is the total number of wells having a dry state?" to the intended action of data identifying the total number of instances for the entity of oil wells in a dry state. In some embodiments, the intended action may include an action to execute a workflow, receive information, or execute any variety of tasks using the oil-gas domain application.

The process 500 further may include applying NLP and AI techniques to expand utterances linked to action and entity (as at 530). For example, the virtual assistant application server 220 may apply NLP and AI techniques to the utterance (e.g., from block 520) to expand the set of utterances linked to the intended action and entity (e.g., by linking additional utterances to the intended action and entity). As an example, the additional utterance "How many wells in total have the dry state?" may be linked to the intended action and entity. Additional variations to the utterances may be linked based on applying any suitable variety of NLP and AI techniques.

As further shown in FIG. 5, the process 500 may be repeated to link additional utterances to additional intended actions and entities. In this way, a trained model may be generated in which the trained model includes a set of separate actions and entities, and utterances linked to each action and entity.

The process 500 also may include storing the trained model for deployment (as at 540). For example, the virtual assistant application server 220 may store the trained model for deployment. As described here, the trained model may be used by the virtual assistant application server 220 for processing input utterances received from a user (e.g., utterances received by voice and/or text input) as described in greater detail with respect to FIG. 6.

The process 500 further may include receiving feedback on the trained model (as at 550). For example, the virtual assistant application server 220 may receive feedback, which may indicate whether the trained model is properly identifying a correct user intent and entity based on user utterances. In some embodiments, the feedback may indicate that an utterance resulted in an incorrect action being taken in response to the utterance and may further indicate the correct action that should have been taken in response to the utterance.

The process 500 also may include updating the trained model based on the feedback (as at 560). For example, the virtual assistant application server 220 may update the trained model based on the feedback indicating correct actions and entities to link to utterances. In some embodiments, blocks 550 and 560 may be repeated. In this way, the trained model may be continued to be refined based on the feedback.

Figure 6:
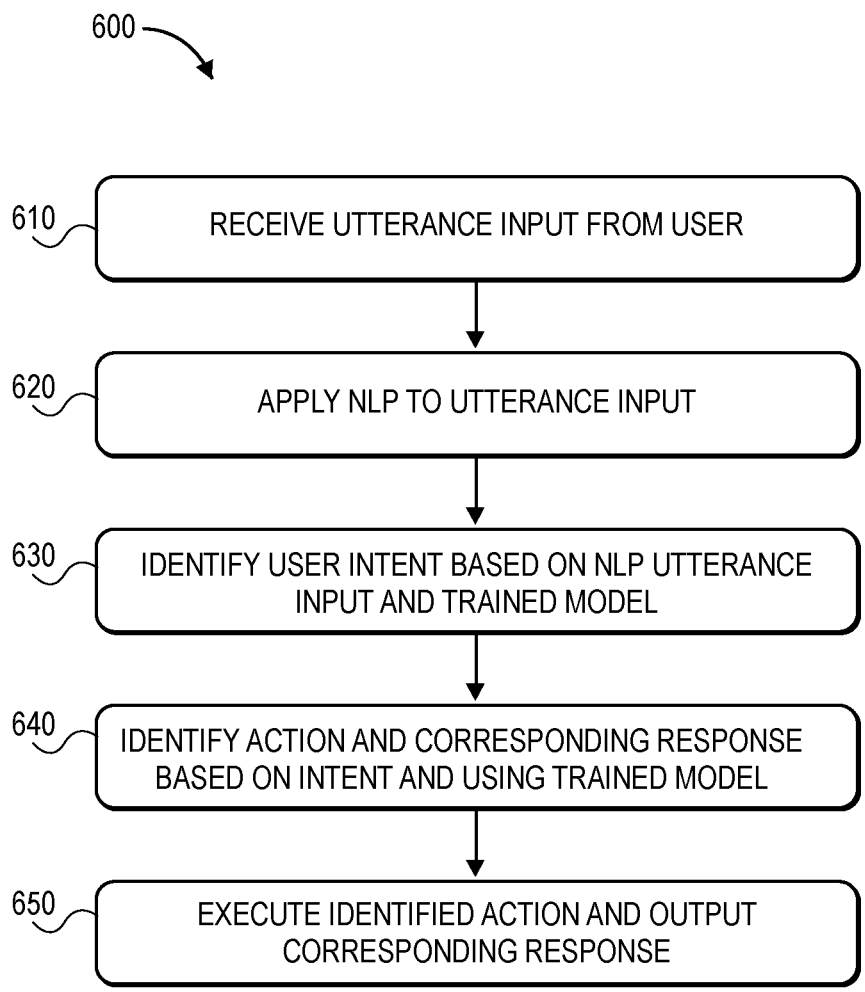
FIG. 6 illustrates an example flowchart of a process for responding to user's utterance by a virtual assistant using a trained model in accordance with aspects of the present disclosure as described herein.

FIG. 6 illustrates an example flowchart of a process for responding to user's utterance by a virtual assistant using a trained model in accordance with aspects of the present disclosure. The blocks of FIG. 6 may be implemented in the environment of FIG. 2, for example, and are described using reference numbers of elements depicted in FIG. 2. As noted herein, the flowchart illustrates the architecture, functionality, and operation of possible implementations of systems, methods, and computer program products according to various embodiments of the present disclosure.

As shown in FIG. 6, the process 600 may include receiving an utterance input from a user (as at 610). For example, the virtual assistant application server 220 may receive an utterance input via a virtual assistant hosted by the client device 210. In some embodiments, the utterance input may be a user voice/speech input. As described herein, the virtual assistant may be integrated in an oil-gas domain application for receiving the user utterance to facilitate the navigation and/or control of the oil-gas domain application.

The process 600 also may include applying NLP to utterance input (as at 620). For example, the virtual assistant application server 220 may apply NLP to the utterance input using any variety of suitable NLP techniques. In some embodiments, applying NLP may identify variations of the utterance input (e.g., variations of the voice input spoken by the user).

The process 600 further may include identifying the user's intent based on the NLP utterance input and a trained model (as at 630). For example, the virtual assistant application server 220 may identify user's intent after applying the NLP and using a trained model (e.g., a trained model generated in accordance with process 500 of FIG. 5). In some embodiments, the intent may relate to the user's intent for navigating through the oil-gas domain application.

The process 600 also may include identifying an action and corresponding response based on the intent and using the trained model (as at 640). For example, the virtual assistant application server 220 may identify an action and corresponding response based on the intent and using the trained model. As described herein, the trained model may identify an appropriate action and a response that corresponds to the user's intent linked to the user's utterance received by the virtual assistant.

The process 600 further may include executing the identified action and outputting a corresponding response (as at 650). For example, the virtual assistant application server 220 may execute the identified action and output a corresponding response. More specifically, the virtual assistant application server 220 may execute the identified action by performing the task via the oil-gas domain application hosted by the client device 210 and/or executing a workflow. In some embodiments, the virtual assistant application server 220 may output a response to be displayed and/or read aloud by the virtual assistant integrated within the oil-gas application. The process 600 may be repeated for each utterance received from the user. Examples of receiving user utterances and responding to the user utterances are shown in FIGS. 3A to 3L.

Figure 7:
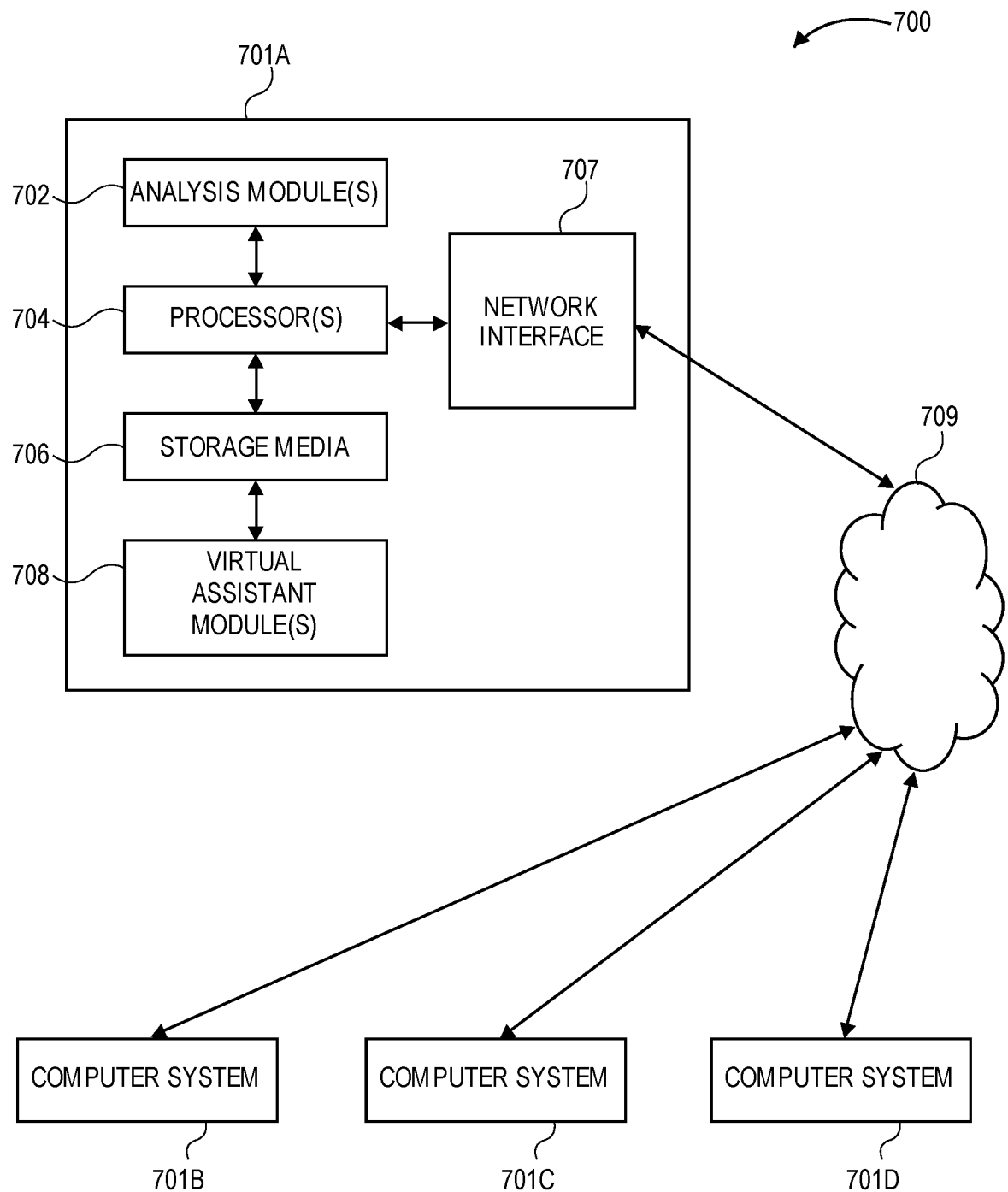
FIG. 7 illustrates a schematic view of a computing system, according to an embodiment.

In some embodiments, the methods of the present disclosure may be executed by a computing system. FIG. 7 illustrates an example of such a computing system 700, in accordance with some embodiments. The computing system 700 may include a computer or computer system 701A, which may be an individual computer system 701A or an arrangement of distributed computer systems. The computer system 701A includes one or more analysis modules 702 that are configured to perform various tasks according to some embodiments, such as one or more methods disclosed herein. To perform these various tasks, the analysis module 602 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents).

A processor may include a microprocessor, microcontroller, processor module or subsystem, programmable integrated circuit, programmable gate array, or another control or computing device.

The storage media 706 may be implemented as one or more computer-readable or machine-readable storage media. Note that while in the example embodiment of FIG. 7 storage media 706 is depicted as within computer system 701A, in some embodiments, storage media 706 may be distributed within and/or across multiple internal and/or external enclosures of computing system 701A and/or additional computing systems. Storage media 706 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media may be located either in the machine running the machine-readable instructions, or located at a remote site from which machine-readable instructions may be downloaded over a network for execution.

In some embodiments, computing system 700 contains one or more virtual assistant virtual assistant module(s) 708. In the example of computing system 700, computer system 701A includes the virtual assistant module 708. In some embodiments, a single virtual assistant module 707 may be used to perform some aspects of one or more embodiments of the methods disclosed herein. In other embodiments, a plurality of virtual assistant modules 708 may be used to perform some aspects of methods herein.

It should be appreciated that computing system 700 is merely one example of a computing system, and that computing system 700 may have more or fewer components than shown, may combine additional components not depicted in the example embodiment of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of the present disclosure.

Computational interpretations, models, and/or other interpretation aids may be refined in an iterative fashion; this concept is applicable to the methods discussed herein. This may include use of feedback loops executed on an algorithmic basis, such as at a computing device (e.g., computing system 700, FIG. 7), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or limiting to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosed embodiments and various embodiments with various modifications as are suited to the particular use contemplated.

What is claimed is:

1. A computer-implemented method for facilitating navigation of an oil-gas domain application using a virtual assistant integrated within the oil-gas domain application comprising:
generating a trained model for responding to utterances received from a user via the virtual assistant integrated within the oil-gas domain application, wherein the trained model links the utterances to respective actions and responses, the generating the trained model further comprising:
receiving information identifying an intended action to perform in the oil-gas domain application and an entity associated with the intended action and the oil-gas domain application,
linking an utterance to the intended action and the entity, and
after the linking the utterance to the intended action and the entity, expanding utterances linked to the intended action and the entity by applying natural language processing and artificial intelligence techniques to the utterance;
receiving a user utterance via the virtual assistant integrated within the oil-gas domain application;
determining a response to the user utterance using the trained model, wherein the response is associated with performing an action within the oil-gas domain application; and
providing the response to the virtual assistant to cause the virtual assistant to execute the action within the oil-gas domain application.

2. The method of claim 1, further comprising applying the natural language processing to the user utterance, wherein the determining the response to the user utterance is based on an output from the applying the natural language processing to the user utterance.

3. The method of claim 1, wherein the receiving the user utterance comprises receiving the voice input as converted text.

4. The method of claim 1, wherein the action includes at least one of:
providing the user with information associated with the user utterance; or
executing a workflow.

5. The method of claim 1, wherein the virtual assistant is portable and integrated into additional applications.

6. The method of claim 1, wherein the entity relates to one of an application service, a type of data, a data repository, a computing system, and a machine.

7. The method of claim 1, wherein the intended action defines a task to be performed associated with the entity.

8. A computing system, comprising:
one or more processors; and
a memory system comprising one or more non-transitory computer-readable media storing instructions that, when executed by at least one of the one or more processors, cause the computing system to perform operations comprising:
generating a trained model for responding to utterances received from a user via a virtual assistant integrated within an oil-gas domain application, wherein the trained model links the utterances to respective actions and responses, the generating the trained model further comprising:
receiving information identifying an intended action to perform in the oil-gas domain application and an entity associated with the intended action and the oil-gas domain application,
linking an utterance to the intended action and the entity, and
after the linking the utterance to the intended action and the entity, expanding utterances linked to the intended action and the entity by applying natural language processing and artificial intelligence techniques to the utterance;

receiving a user utterance via the virtual assistant integrated within the oil-gas domain application;

determining a response to the user utterance using the trained model, wherein the response is associated with performing an action within the oil-gas domain application; and providing the response to the virtual assistant to cause the virtual assistant to execute the action within the oil-gas domain application.

9. The computing system of claim 8, further comprising applying the natural language processing to the user utterance, wherein the determining the response to the user utterance is based on an output from the applying the natural language processing to the user utterance.

10. The computing system of claim 8, wherein the receiving the user utterance comprises receiving the voice input as converted text.

11. The computing system of claim 8, wherein the action includes at least one of:
providing the user with information associated with the user utterance; or
executing a workflow.

12. The computing system of claim 8, wherein the virtual assistant is portable and integrated into additional applications.

13. The computing system of claim 8, wherein the entity relates to one of an application service, a type of data, a data repository, a computing system, and a machine.

14. The computing system of claim 8, wherein the intended action defines a task to be performed associated with the entity.

15. A non-transitory computer-readable medium storing instructions that, when executed by one or more processors of a computing system, cause the computing system to perform operations comprising:
generating a trained model for responding to utterances received from a user via a virtual assistant integrated within an oil-gas domain application, wherein the trained model links the utterances to respective actions and responses, the generating the trained model further comprising:

receiving information identifying an intended action to perform in the oil-gas domain application and an entity associated with the intended action and the oil-gas domain application, linking an utterance to the intended action and the entity, and after the linking the utterance to the intended action and the entity, expanding utterances linked to the intended action and the entity by applying natural language processing and artificial intelligence techniques to the utterance;

receiving a user utterance via the virtual assistant integrated within the oil-gas domain application;

determining a response to the user utterance using the trained model, wherein the response is associated with performing an action within the oil-gas domain application; and providing the response to the virtual assistant to cause the virtual assistant to execute the action within the oil-gas domain application.

16. The computer-readable medium of claim 15, further comprising applying the natural language processing to the user utterance, wherein the determining the response to the user utterance is based on an output from the applying the natural language processing to the user utterance.

17. The computer-readable medium of claim 15, wherein the action includes at least one of:
providing the user with information associated with the user utterance; or
executing a workflow.

18. The computer-readable medium of claim 15, wherein the virtual assistant is portable and integrated into additional applications.

19. The computer-readable medium of claim 15, wherein the entity relates to one of an application service, a type of data, a data repository, a computing system, and a machine.

20. The computer-readable medium of claim 15, wherein the intended action defines a task to be performed associated with the entity.

* * * * *